Aug. 30, 1932.  A. J. CHRISTOPHER  1,874,242
INDUCTANCE NETWORK
Filed May 25, 1929

INVENTOR
A. J. CHRISTOPHER
BY
G. H. Stevenson
ATTORNEY

Patented Aug. 30, 1932

1,874,242

UNITED STATES PATENT OFFICE

ARTHUR J. CHRISTOPHER, OF YONKERS, NEW YORK, ASSIGNOR TO BELL TELEPHONE LABORATORIES, INCORPORATED, OF NEW YORK, N. Y., A CORPORATION OF NEW YORK

INDUCTANCE NETWORK

Application filed May 25, 1929. Serial No. 365,965.

This invention relates to electrical reactance networks and more particularly to balanced inductance networks.

The principal object of the invention is to reduce the number of coils required in a three-terminal inductance network.

Another object is to reduce the weight and size of a three-element inductance network.

A further object is to increase the degree of balance obtainable in a three-element inductance network.

In effecting these objects, use is made of the mutual induction existing between two coil windings wound on the same core. It has been shown in the article "Mutual inductance in wave filters with an introduction in filter design" by K. S. Johnson and T. E. Shea in the Bell System Technical Journal, January, 1925, that a two-winding coil or transformer is electrically equivalent to a star or to a delta network of three inductances. If the two coil windings are equal and connected series-aiding, the equivalent star network is a symmetrical T structure, the shunt branch of which is a negative inductance and the two series branches equal positive inductances. The terminals of the structure are constituted by the junction of the two windings and the two free ends of the windings. If, furthermore, the coupling between the two windings be perfect, i. e., the coefficient of coupling unity, the shunt branch of the equivalent T will have a negative inductance precisely equal in magnitude to the positive self-inductance of each of the windings, while the series branches of the equivalent T will have positive inductances equal to twice the self-inductance of each winding and will be very accurately balanced. This condition of unity coupling is closely approximated in either a bifilar or an interleaved winding on a toroidal core composed of a material having high permeability. This invention contemplates connecting a single winding, or two-terminal, coil of known value to the junction point of the double-winding coil, whereby it is possible to assign to the shunt arm of the equivalent T network any desired positive inductance value, and any value of negative inductance not greater than the self-inductance of each winding. From this, it follows that the inductance between the free terminal of the single-winding coil and either of the free terminals of the double-winding coil can be made any desired positive value.

Tht usual method of obtaining a symmetrical T network is by the use of three separate coils having no appreciable mutual inductance between any two. In accordance with the present invention it is possible to arrive at the same result by using only two coils, i. e., two separate cores. Furthermore, without making use of mutual inductance it is not possible to obtain a structure whose equivalent T network has a negative inductance branch nor is it possible to obtain as high a degree of impedance balance between the two series inductances of the T equivalent. Coils having mutual inductance so disposed that the structure is equivalent to a T-network comprising a negative inductance branch, having previously been suggested and constructed, but in these cases the magnitude of the negative inductance has been controlled by regulating the coefficient of coupling, which is not easily accomplished with great accuracy.

Figure 1:
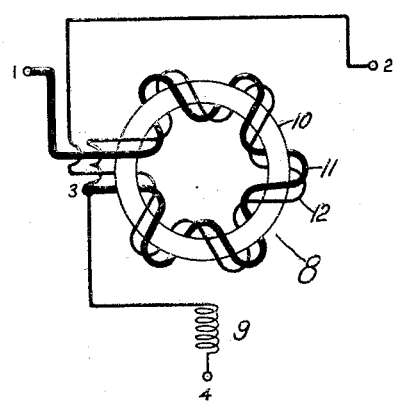
Fig. 1 shows in schematic form, a network in accordance with the invention.

The invention is illustrated in Fig. 1, in which 8 is a double-winding inductance coil and 9 is a single-winding coil which is not magnetically coupled with coil 8. Coil 8 comprises a toroidal magnetic core 10 on which are wound two equal windings 11 and 12 of insulated electrical conductor. The core material may be any high permeability substance such as silicon steel or a nickel-iron alloy. The windings consist preferably of a twisted pair of equal sized conductors, each one of the pair constituting a bifilar winding. An end of one winding is joined to the end of the other in the series-aiding connection, that is, the connection which causes both windings to continue around the core in the same direction. The junction of the two windings is designated terminal 3 and the free ends of the windings are designated terminals 1 and 2. One end of the single-winding coil 9 is connected to terminal 3, the other end, designated terminal 4 being free. Terminals 1, 2 and 4 constitute the terminals of the system.

Figure 2:
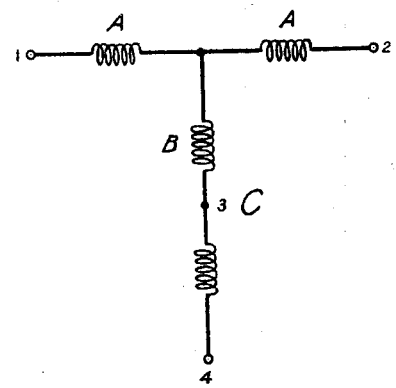
Fig. 2 is a schematic diagram of a T network electrically equivalent to that in Fig. 1.

It is well known that a coil such as 8 is electrically equivalent to a three-branch T, or star, connected network of inductances in which two of the branches are equal positive inductances and the third branch a negative inductance. Equivalence of networks as here used, means that one network can be substituted for the other in any system without affecting the current and voltage relations in any other part of the system. A system equivalent to that in Fig. 1 is shown in Fig. 2 in which inductances A, A and B constitute the T network equivalent to coil 8. The terminals are numbered 1, 2, 3 and 4 to correspond to the same numbered terminals in Fig. 1. The inductance 9 is shown connected at terminals 3, as in Fig. 1. The shunt arm, consisting of inductances B and 9 in series, is designated C.

Since the core 10 has a high permeability, there is practically no magnetic leakage and the coefficient of coupling between the two windings 11 and 12 is practically unity. Consequently, the mutual inductance, which will be called M, is practically equal to the self-inductance, called L, of each of the equal windings. The inductances of the equivalent T network bear the relations:

$$A = +2L = +2M \quad (1)$$
$$B = -M = -L \quad (2)$$

When the two windings 11 and 12 are wound bifilarly with the same kind of conductor, the empedance balance between the two series branches A, A is very close at all frequencies. The invention is not limited to a bifilar winding, however. A coil in which the two windings are applied separately, but have their portions interleaved with each other can be made to furnish a fairly accurate impedance balance and a coefficient of coupling practically equal to that of a bifilar wound coil.

Connecting coil 9 at its terminal 3 has the effect of connecting the positive inductance, which will be called $L_2$, of coil 9 in series with the negative inductance B of the equivalent T network. Since $L_2$ and B are additive, the resultant shunt arm C of the structure in Fig. 2 can be given any positive value, or any negative value less than that of B.

In designing coils 8 and 9 in accordance with the constants of the T structure to which the system of Fig. 1 is to be made equivalent, it is simply necessary to make use of formulæ (1) and (2), From formula (1) it follows that the self-inductance L of each of the equal windings 11 and 12 should be equal to half of the required inductance A of each of the series arms of the T equivalent. From formula (2), it follows that without the addition of $L_2$, the shunt arm of the T has a negative inductance equal to $-L$. Consequently, the inductance $L_2$ must be of such a value that the quantity $(L_2-B)$ is equal to the required inductance of the shunt arm. The inductance between the shunt terminal and either one of the series terminals is equal to $(+L_2)$, so if it is desirable to assign a value to this inductance it is simply necessary to choose a value of $L_2$ accordingly.

Figure 3:
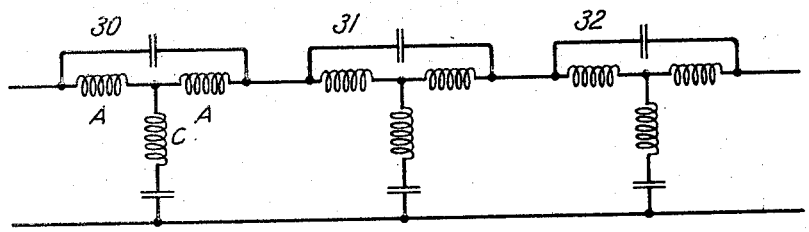
Fig. 3 is a schematic diagram of a phase shifter in which are included networks in accordance with this invention.

Fig. 3 is an example of a system in which the invention has application. This shows an electrical phase shifting network comprising three "bridged-T" sections 30, 31 and 32, each section including a T, or star, system of inductances. In section 30, the branches of the inductance network are designated A, A and C to correspond with the branches in Fig. 2. Obviously, the equivalent of this inductance network can be supplied by the system in Fig. 1.

The invention is applicable in other systems such as electrical filters and attenuation equalizers as well as in phase shifters. In phase shifters, such as that of Fig. 3, the shunt inductance C is generally negative, while in filters and equalizers, it is usually positive.

What is claimed is:

1. A four-terminal transmission network of the bridged-T type, said network including a bridging impedance and a T-network, said T-network comprising in series-shunt combination a double-winding inductance coil and a single-winding inductance coil, said double-winding coil having equal windings forming series inductances and joined in the series-aiding connection, the coefficient of inductive coupling between them being substantially unity, said single-winding soil having one terminal connected as a shunt impedance to the junction of the two windings of said double-winding coil.

2. A wave transmission network having a pair of input terminals and a pair of output terminals, said network comprising electrical paths between each input terminal and a respectively associated output terminal, a pair of equal inductances included in series in one of said paths, an impedance network connected in parallel with said inductances between the outer terminals thereof, and a second impedance network connected between the junction point of said inductances and a point in the other of said paths, said pair of equal inductances being wound bifilarly on a toroidal core of relatively high magnetic permeability, and said pair of inductances being joined in the series-aiding connection.

3. In a wave transmisison network of the bridged-T form, said network having a pair of input terminals and a pair of output terminals, a plurality of electric paths between an input terminal and a respectively associated output terminal, one of said paths comprising a pair of equal inductances, and an impedance network joined to the junction of said pair of equal inductances, said impedance network comprising a third inductance, said pair of equal inductances being of the interleaved type wound on a toroidal core of relatively high magnetic permeability, and said pair of equal inductances being joined in the series-aiding connection.

4. In a bridged-T network comprising a bridging impedance and a T-network, a combination of inductance coils forming said T-network, said combination consisting of a double-winding inductance coil and a single-winding inductance coil, said double-winding coil comprising equal windings joined in the series-aiding connection and having a coefficient of inductive coupling between them substantially equal to unity, whereby the inductances of the series branches of said T-network are equivalent to each other and to substantially twice the self-inductance of each winding, said single-winding coil having one end connected to the junction of the two windings of said double-widing coil.

In witness whereof, I hereunto subscribe my name, this 23 day of May, 1929.

ARTHUR J. CHRISTOPHER.